United States Patent
Pillai et al.

(10) Patent No.: US 10,721,539 B1
(45) Date of Patent: *Jul. 21, 2020

(54) DETECTION OF IMPAIRMENTS IN A NETWORK SYSTEM

(71) Applicant: CSC Holdings, LLC, Bethpage, NY (US)

(72) Inventors: Pragash Pillai, Centerport, NY (US); John Nicastro, Smithtown, NY (US); Todd Kuty, Huntington, NY (US); Brian Daniels, Commack, NY (US); Robert Zito, Staten Island, NY (US)

(73) Assignee: CSC Holdings, LLC, Bethpage, NY (US)

( * ) Notice: Subject to any disclaimer, the term of this patent is extended or adjusted under 35 U.S.C. 154(b) by 542 days.

This patent is subject to a terminal disclaimer.

(21) Appl. No.: 14/874,069

(22) Filed: Oct. 2, 2015

Related U.S. Application Data

(63) Continuation of application No. 13/804,716, filed on Mar. 14, 2013, now Pat. No. 9,160,447.

(51) Int. Cl.
| | | |
|---|---|---|
| *H04B 10/07* | (2013.01) | |
| *H04B 10/079* | (2013.01) | |
| *H04N 21/647* | (2011.01) | |
| *H04B 10/2575* | (2013.01) | |
| *H04N 21/61* | (2011.01) | |

(52) U.S. Cl.
CPC ....... *H04N 21/64738* (2013.01); *H04B 10/07* (2013.01); *H04B 10/0795* (2013.01); *H04B 10/25751* (2013.01); *H04N 21/6118* (2013.01); *H04N 21/6168* (2013.01)

(58) Field of Classification Search
None
See application file for complete search history.

(56) References Cited

U.S. PATENT DOCUMENTS

| | | |
|---|---|---|
| 6,714,598 B2 | 3/2004 | Sorenson et al. |
| 7,072,365 B1 | 7/2006 | Ansley |
| 7,075,918 B1 | 7/2006 | Kung et al. |
| 7,120,123 B1 | 10/2006 | Quigley et al. |
| 7,616,654 B2 | 11/2009 | Moran et al. |
| 8,428,465 B2 | 4/2013 | Biegert et al. |
| 9,088,355 B2 * | 7/2015 | Moore ................. H04B 10/077 |
| 2003/0086140 A1 | 5/2003 | Thomas et al. |
| 2004/0167731 A1 | 8/2004 | Wang et al. |
| 2005/0058082 A1 * | 3/2005 | Moran, III .............. H04L 25/00 370/252 |
| 2005/0226161 A1 | 10/2005 | Jaworski |
| 2007/0223512 A1 * | 9/2007 | Cooper ................... H04L 1/206 370/437 |
| 2008/0170853 A1 | 7/2008 | Rakib et al. |
| 2008/0193137 A1 | 8/2008 | Thompson et al. |
| 2008/0310842 A1 | 12/2008 | Skrobko |
| 2009/0083279 A1 | 3/2009 | Hasek |

(Continued)

*Primary Examiner* — Li Liu
(74) *Attorney, Agent, or Firm* — Sterne, Kessler, Goldstein & Fox P.L.L.C.

(57) ABSTRACT

Embodiments of the present disclosure describe a system an method for detecting impairments in a network. The network may be a hybrid fiber-coaxial (HFC) network. The system may include a node evaluation unit for evaluating the operation of one or more nodes in the network to determine whether the nodes are operating as desired, or whether service is required.

14 Claims, 5 Drawing Sheets

(56) References Cited

U.S. PATENT DOCUMENTS

| | | |
|---|---|---|
| 2010/0083330 A1 | 4/2010 | Bernstein et al. |
| 2010/0100871 A1 | 4/2010 | Celeskey et al. |
| 2010/0104287 A1* | 4/2010 | Biegert ............... H04J 3/1694 398/67 |
| 2010/0239251 A1 | 9/2010 | Biegert et al. |
| 2011/0069745 A1* | 3/2011 | Thompson ....... H04B 10/25751 375/224 |
| 2012/0051734 A1 | 3/2012 | Weiss et al. |
| 2012/0251113 A1 | 10/2012 | Hajduczenia et al. |
| 2013/0094859 A1 | 4/2013 | Nielsen et al. |
| 2013/0236177 A1 | 9/2013 | Fang et al. |
| 2013/0330087 A1 | 12/2013 | Vogel et al. |
| 2014/0029655 A1* | 1/2014 | Thompson ......... H04B 10/0795 375/224 |
| 2014/0133533 A1* | 5/2014 | Thibeault ............. H04L 47/125 375/222 |
| 2014/0185428 A1* | 7/2014 | Thibeault ............... H04L 47/12 370/225 |
| 2014/0282774 A1* | 9/2014 | Nair ..................... H04N 17/004 725/107 |

\* cited by examiner

DETECTION OF IMPAIRMENTS IN A NETWORK SYSTEM

BACKGROUND OF THE INVENTION

Technical Field

Embodiments of the present disclosure relate generally to detecting impairments in a network.

Background Art

A conventional network includes nodes that route some form of data between a service provider and customers that subscribe to the service. Often, a network includes many nodes—sometimes hundreds or thousands. In turn, each node in a conventional network may serve hundreds or thousands of customers. Thus, a single malfunctioning node can negatively affect a large number of customers, decreasing customer satisfaction with the service and the service provider.

Service providers often take a reactive approach to detecting impairments in the networks that they maintain and operate. This may be because the service providers do not have the ability to monitor the network equipment—such as nodes—in real-time, and therefore are unaware when equipment in the network begins to malfunction. Consequently, customers themselves must notify the service provider of interruption in their service before the service provider dispatches a technician to troubleshoot the network. This reactive approach can lead to long service outages, again decreasing customer satisfaction.

Thus, a proactive approach to detecting impairments in a network is needed in order to minimize or eliminate service outages caused by malfunctioning network equipment and to increase customer satisfaction.

BRIEF SUMMARY OF THE INVENTION

Embodiments of the present disclosure describes a system and method for identifying impairments in a network. Some embodiments describe a HFC network system having the ability to detect when nodes in the network are operating at or below desired levels of functionality. Other embodiments describe a method for detecting one or more nodes in a HFC network that are operating at or below desired levels of functionality. These and other features of the disclosure are described in more detail below.

BRIEF DESCRIPTION OF THE DRAWINGS/FIGURES

DETAILED DESCRIPTION OF THE INVENTION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The terms "embodiments" or "embodiments of the invention" do not require that all embodiments include the discussed feature, advantage, or mode of operation. Alternate embodiments may be devised without departing from the scope or spirit of the disclosure, and well-known elements may not be described in detail or may be omitted so as not to obscure the relevant details. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
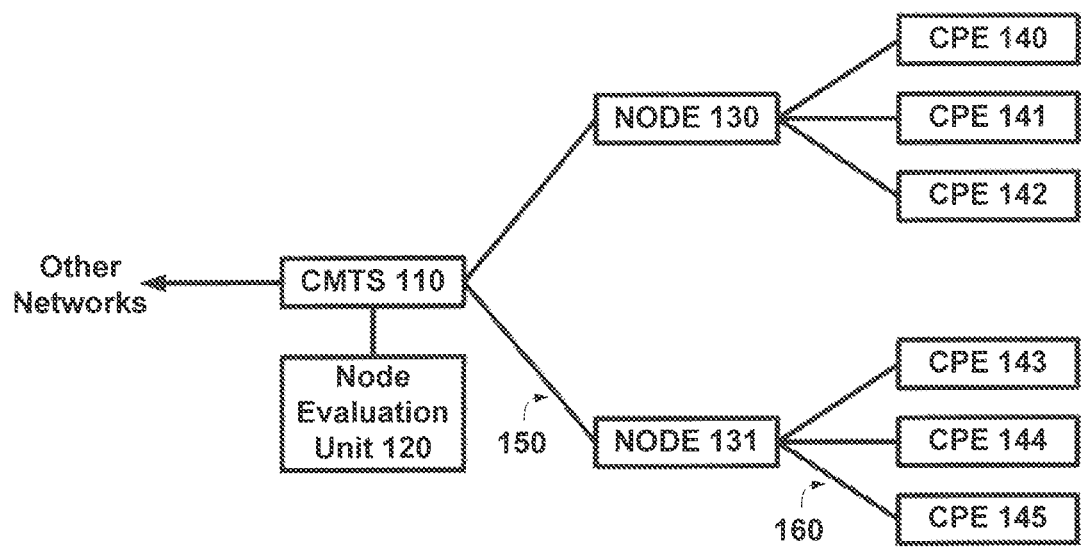
FIG. 1 illustrates a block diagram of an example hybrid fiber-coaxial (HFC) network system in accordance with an embodiment of the present disclosure.

Turning to FIG. 1, an example hybrid fiber-coaxial (HFC) network system 100 in accordance with an embodiment of the present disclosure is illustrated. The HFC network system 100 includes cable modem termination system (CMTS) 110, nodes 130-131, customer premise equipment (CPE) 140-145, and node evaluation unit 120. The nodes 130-131 are communicatively coupled to CMTS 110 by fiber optic cabling 150. Each CPE 140-145 is communicatively coupled to one of the nodes 130-131 by coaxial cabling 160. In some embodiments, CMTS 110 and CPE 140-145 may be considered "endpoints" of the HFC network system 100.

CMTS 110 includes equipment for providing data and/or voice services—such as cable television (CATV), Internet service, telephony service, and the like—to CPE 140-145. CMTS 110 and CPE 140-145 communicate, i.e., transport signals, through nodes 130-131 using a communications protocol; the communications protocol may adhere to the Data Over Cable Service Interface Specification (DOCSIS), or any other standard or specification. In some embodiments CMTS 110 may include or be communicatively coupled to equipment for connecting to and communicating with other networks—including but not limited to satellite networks, telephone networks (e.g., the plain old telephone service (POTS)), computer networks (e.g., the Internet), and the like.

As should be apparent to a person of ordinary skill in the art, the HFC network system 100 of FIG. 1 can include any number—one, tens, hundreds, thousands, etc.—of CMTSs, nodes, and CPE. For example, an HFC network may include at least one CMTS, maintained and operated at a service provider's headend, which is coupled to hundreds of nodes distributed at physically separate geographic locations. In this example, each node may be coupled to thousands of CPE which are each maintained and operated at subscribers' homes, businesses, etc. Examples of CPE 140-145 include, but are not limited to, cable modems, set-top boxes, routers, switches, gateways, telephones, network adaptors, and the like.

The nodes 130-131 of FIG. 1, which may be "fiber nodes" or "fiber optic nodes," facilitate communications between CMTS 110 and CPE 140-145 in both the downstream (i.e., from CMTS 110 to CPE 140-145) and upstream (i.e., from CPE 140-145 to CMTS 110) directions. Each node 130-131 is configured to perform optical-to-electrical signal conversion in order to transport signals received from CMTS 110 to CPE 140-145, and electrical-to-optical signal conversion in order to transport signals received from CPE 140-145 to CMTS 110. As such, each node 130-131 includes the necessary equipment—hardware, software, or a combination of hardware and software—to send and receive optical signals over fiber optic cable, perform both optical-to-electrical and electrical-to-optical signal conversion, and send and receive electrical signals over coaxial cable. Software may be embodied as instructions on non-transitory computer readable media.

As an example of communication in the downstream direction, the node 130 may receive an optical signal transmitted over the fiber optic cabling 150 from CMTS 110, convert the optical signal to an electrical signal, and transmit the electrical signal over the coaxial cabling 160 to CPE 140. As an example of communication in the upstream direction, the node 130 may receive an electrical signal transmitted over the coaxial cabling 160 from CPE 140, convert the electrical signal to an optical signal, and transmit the optical signal over the fiber optic cabling 150 to CMTS 110.

Returning to FIG. 1, the HFC network system 100 also includes node evaluation unit 120 for monitoring and/or evaluating the operation of each node 130-131 in the system 100—which includes determining whether one or more nodes in the system are malfunctioning or are "in distress." In an example embodiment, the node evaluation unit 120 analyzes metrics associated with communications between the endpoints communicating through a node in order to compute a node health value (NHV) for the node.

The NHV may be compared to a threshold, e.g., a node health threshold ($T_{NH}$), and the comparison may indicate whether the node was operating properly at the time the NHV was calculated. Additionally, in some embodiments, the node evaluation unit 120 may calculate NHVs at different instances of time, compare each NHV to the threshold, and apply criteria or business rules—such as NHVs calculated for n consecutive periods of time failing to meet the threshold, a certain number or percentage of the NHVs failing to meet the threshold for a given period of time, etc.—to determine whether the node is operating properly, or whether the node requires servicing. Threshold values, criteria or business rules, the events that constitute node malfunctions, and the like may be defined by the party charged with maintaining and operating the HFC network system, which is often one or more service providers.

Regarding the metrics, the HFC network system 100 includes the mechanisms necessary to generate one or more metrics describing the operation of the components in the network. For each node in the HFC network, the node evaluation unit 120 analyzes metrics generated for each CPE communicating through the node to calculate the NHV for the node. More specifically, the node evaluation unit 120 calculates a failure rate for each metric on a per node basis. The failure rate is calculated by comparing each metric to a pass/fail threshold specific to that metric, and aggregating the number of times the metric fails to meet its threshold. The calculation of the failure rate of a metric may be realized using Equation 1:

$$\text{Failure Rate} = \frac{\text{number of } CPE \text{ per node} - \text{total metric fails per node}}{\text{number of } CPE \text{ per node}} \quad \text{(Eq. 1)}$$

After the failure rate is calculated for each metric, the NHV for the node is determined by calculating a weighted sum of the failure rates. Calculation of the NHV for a given node may be realized using Equation 2:

$$\text{NHV} = w_1 FR_{M1} + w_2 FR_{M2} + w_3 FR_{M3} + w_4 FR_{M4} + \ldots + w_n FR_{Mn} \quad \text{(Eq. 2)}$$

where FR is the failure rate for a given metric, and $w_{1-n}$ are the weights. Weights may be defined by the party charged with maintaining and operating the HFC network system, which is often one or more service providers.

As an example, the HFC network system 100 of FIG. 1 may generate four metrics—M1, M2, $M_3$, and M4—for each CPE 140-145. To calculate a NHV for node 130, the metrics generated for CPE 140, 141, and 142, i.e., the CPE coupled to node 130, are compared to pass/fail thresholds, and a failure rate for each metric is determined: $FR_{M1}$, $FR_{M2}$, $FR_{M3}$, and $FR_{M4}$. In this example, the NHV for node 130 is determined by calculating a weighted sum of $FR_{M1}$, $FR_{M2}$, $FR_{M3}$, and $FR_{M4}$. As mentioned, weights may be assigned by the service provider charged with maintaining and operating the HFC network system 100.

As described above, one or more NHVs for a given node may be compared to a node health threshold in the node evaluation unit 120 to determine whether the node is functioning as desired. In some embodiments, the node evaluation unit 120 outputs a distress signal to indicate that a node is malfunctioning. The output signal may be presented to an output device such that service personnel is notified that the node is malfunctioning. Under these circumstances, service personnel may dispatch a technician to investigate the cause of the malfunction and to return the node to proper function. Further, in some embodiments, the node evaluation unit 120 is communicatively coupled to an archiving unit that stores NHVs. In these embodiments, the node evaluation unit 120 can access and analyze previously calculated NHVs to better understand the operational history of the nodes.

Figure 2:
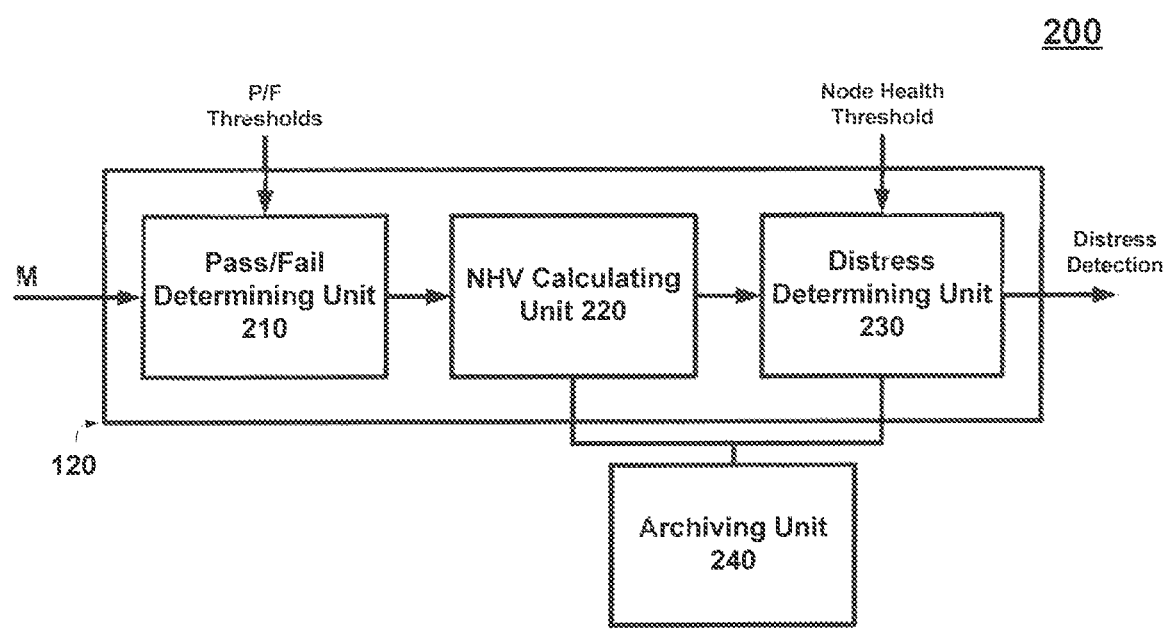
FIG. 2 illustrates a block diagram of an example node evaluation unit for use in the HFC network system of FIG. 1 in accordance with an embodiment of the present disclosure.

Turning to FIG. 2, a block diagram of an example node evaluation unit—such as node evaluation unit 120 of FIG. 1—for use in an HFC network is illustrated. The node evaluation unit 120 of FIG. 2 includes pass/fail determining unit 210, node health value (NHV) calculating unit 220, and distress determining unit 230. The pass/fail determining unit 210 is communicatively coupled to the NHV calculating unit 220, which is communicatively coupled to the distress determining unit 230. In some embodiments, both the NHV calculating unit 220 and the distress determining unit 230 are communicatively coupled to archiving unit 240. The archiving unit 240 may be a separate unit communicatively coupled to the node evaluation unit 120 (e.g., a remote storage device) or may be a component included in the node evaluation unit 120.

As mentioned, the node evaluation unit 120 can evaluate the operation of each node in an HFC network to measure whether the nodes are operating at desired or optimum levels. As such, the node evaluation unit 120 receives, as input, various analytical measurements or metrics M regarding the operation of the HFC network. In the HFC network system 100 of FIG. 1, the metrics may relate to operation of the CMTS 110, operation of CPE 140-145, communications between CMTS 110 and CPE 140-145, and the like. Any number of metrics can be received and analyzed by the node evaluation unit 120.

In one example, the CMTS 110 and CPE 140-145 of FIG. 1 transport signals via a communications protocol adhering to DOCSIS. In this example, the metrics received and analyzed by the node evaluation unit 120 are DOCSIS metrics which include, but are not limited to, the upstream signal-to-noise ratio (USSRN), the upstream codeword error rate (USCER), upstream transmit (USTX), downstream receive (DSRX), the downstream signal-to-noise ratio (DSSNR), the downstream codeword error rate (DSCER), the upstream correctable codeword error rate (USCCER), T3 timeouts (T3), and the like.

In the example node evaluation unit 120 of FIG. 2, the metrics M are input to pass/fail determining unit 210, which also receives a pass/fail threshold for each metric. The pass/fail determining unit 210 compares each metric to its pass/fail threshold, and outputs a pass/fail value for each metric indicating whether the metric meets its threshold. The pass/fail value for each metric may be a Boolean value (e.g., "true" for pass, "false" for fail), a binary value (e.g., "1" for pass, "0" for fail), and the like.

The pass/fail values output from the pass/fail determining unit 210 are received as input to the NHV calculating unit 220, which calculates a NHV for the node using Eq. 1 described above. Since the NHV calculating unit 220 of FIG. 2 is coupled to the archiving unit 240, calculated NHVs can be archived and accessed for future use and consideration. The archiving unit 240 may be any type of recording system—such as computer memory, a database, etc.—that can be used to store and retrieve NHVs calculated by the NHV calculating unit 220.

The distress determining unit 230 receives one or more NHVs, compares each NHV to a node health threshold, and applies criteria to determine whether the node is operating properly. In FIG. 2, the distress determining unit 230 receives NHVs output by the NHV calculating unit 220, as well as NHVs archived in the archiving unit 240. The node health threshold and the criteria may be defined by the party charged with maintaining and operating the HFC network system, which is often one or more service providers.

Any criteria may be applied to determine whether a given node is in distress. In one embodiment, the criteria applied by the distress determining unit 230 is whether the current, i.e., most recently calculated, NHV output by the NHV calculating unit 220 meets the node health threshold; failure triggering a distress detection signal. Alternatively, failure of the most recently calculated NHV to meet the threshold may cause the distress determining unit 230 to investigate historical NHVs (e.g., recorded in the archiving unit 240) for the node and consider the node's NHVs over a given time period.

In another embodiment, the criteria is whether NHVs calculated over n consecutive time periods fail to meet the threshold. For example, one NHV per day may be calculated and archived for node 130 of FIG. 1. In this example, the distress determining unit 230 may access the NHVs for three consecutive days, and consider whether the NHVs for the three consecutive days meet the threshold; outputting a distress detection signal output for node 130 when they do not. In yet another embodiment, the criteria may be whether a certain number or percentage of the NHVs that are calculated over a given period of time fail to meet the threshold. For example, the distress determining unit may output a distress signal if 75% of the NHVs for a node fail to meet the threshold over a three day period.

When the distress determining unit 230 determines that a node is in distress, notification—such as a distress detection signal or notification—may be sent to service personnel. In this way, service personnel can identify and service nodes in an HFC network that are not functioning at optimum levels. In some situations, the distress determining unit 230 triggers an incident management ticket to be created for each node in distress, which are then investigated by service personnel or a technician. The ability to proactively identify nodes that are not functioning at optimum levels may improve customer satisfaction by minimizing or eliminating service outages caused by malfunctioning nodes.

In some embodiments, the HFC network system 100 can generate a visual representation indicating the geographic location of the nodes in the network—including one or more nodes that the node evaluation unit 120 has determined to be in distress. In these embodiments, nodes in distress are distinguished from properly operating nodes by some form of visual indicia of distress, such as highlighting in red, flashing, icon enlargement, etc. As an example, the archiving unit 240 may store (in addition to NHVs) geographic location data (e.g., GPS coordinates) for each piece of equipment—including nodes and CPE—in the HFC network. In this example, the node evaluation unit 120 or any other mechanism operated by the service provider can generate or cause to be generated a visual representation of the HFC network by synthesizing (e.g., overlay) the geographic location data with map data. Thus the location of each piece of network equipment may be visually represented as an icon on a map, and equipment in distress (as determined by the node evaluation unit 120) can be accentuated with visual indicia of distress.

Additionally, as described above, CMTS 110 or any other mechanism operated by the service provider may include or be communicatively coupled to equipment for connecting to and communicating with other networks—including but not limited to satellite networks, telephone networks (e.g., the plain old telephone service (POTS)), computer networks (e.g., the Internet), and the like. As such, when the system 100 determines that a given node is in distress, the specific geographic location of that node may be communicated to a technician carrying a mobile communications device (e.g., smartphone, tablet computer, laptop computer, and the like). In this situation, the technician's mobile device can display the geographic location of the node in distress using a mapping application (or any other application). In this way, all available technicians employed by the service provider may be notified of a network impairment and the technician in closest geographic proximity to the impairment may be assigned to service the equipment. These features enable a service provider to communicate detected impairments in a network to a technician in the field in real-time.

Each of the node health evaluation unit 120, pass/fail determining unit 310, node health value calculating unit 320, and distress determining unit 330 described above and illustrated in FIGS. 1-3 may be implemented in hardware, software, or any combination of hardware and software. If implemented in software, the software may be embodied as instructions on a non-transitory computer readable medium, whereby the instructions are executable by one or more processors of the HFC network system to perform the functions described in this disclosure.

Figure 3:
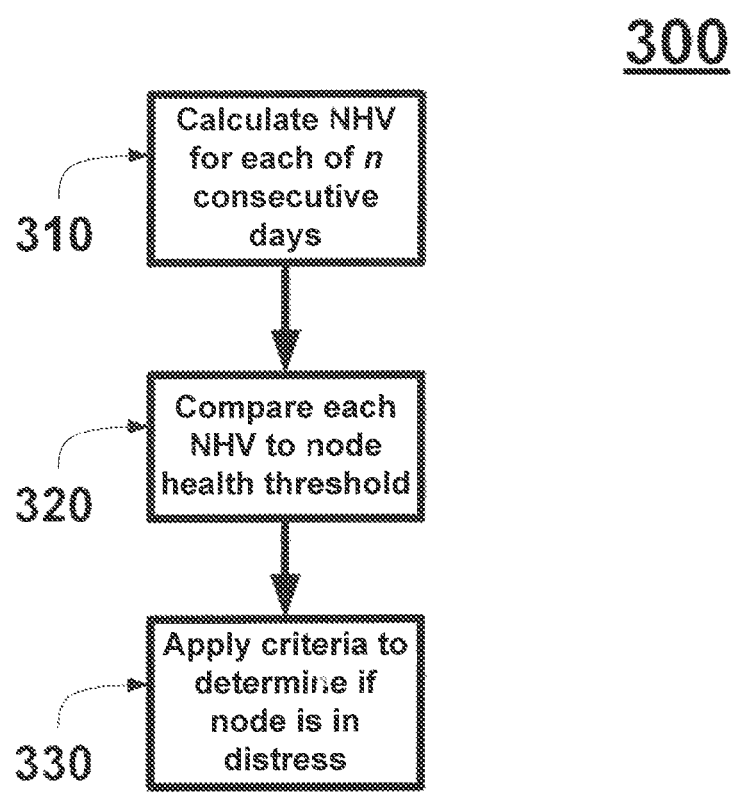
FIG. 3 illustrates a flowchart of an example method for determining whether a node in a HFC network system is in distress in accordance with an embodiment of the present disclosure.

FIG. 3 illustrates a flowchart of an example method for determining whether a node in a HFC network system is in distress in accordance with an embodiment of the present disclosure. The example method of FIG. 3 may be performed by the node evaluation unit 120 described in accordance with FIGS. 1 and 2.

The method 300 begins at stage 310 where a NHV for a given node in a HFC network is calculated for each of n consecutive days. NHVs may be calculated using Eq. 2, described above. NHVs may be archived in a database or any other storage system, such as archiving unit 240 of FIG. 2. Additionally, it should be noted that while stage 310 is described in terms of days, one of ordinary skill in the art would recognize that any time period may be substituted in place of days. For example, a NHV may be calculated every four hours—instead of one time per day—in order to more closely monitor the operation of the node.

At stage 320, each NHV calculated at stage 310 is compared to a node health threshold to determine whether each NHV meets the threshold. Results of stage 320 are analyzed in stage 330, where criteria is applied to determine if the node is in distress. The criteria for determining whether a node is in distress may be developed by the service provider maintaining and operating the HFC network. Any suitable criteria may be applied to determine whether a node is in distress, and several examples are provided above. In the example method of FIG. 3, when it is determined that a node is in distress, notification is sent to service personnel so that the node can be serviced and returned to optimum levels of functionality.

Figure 4:
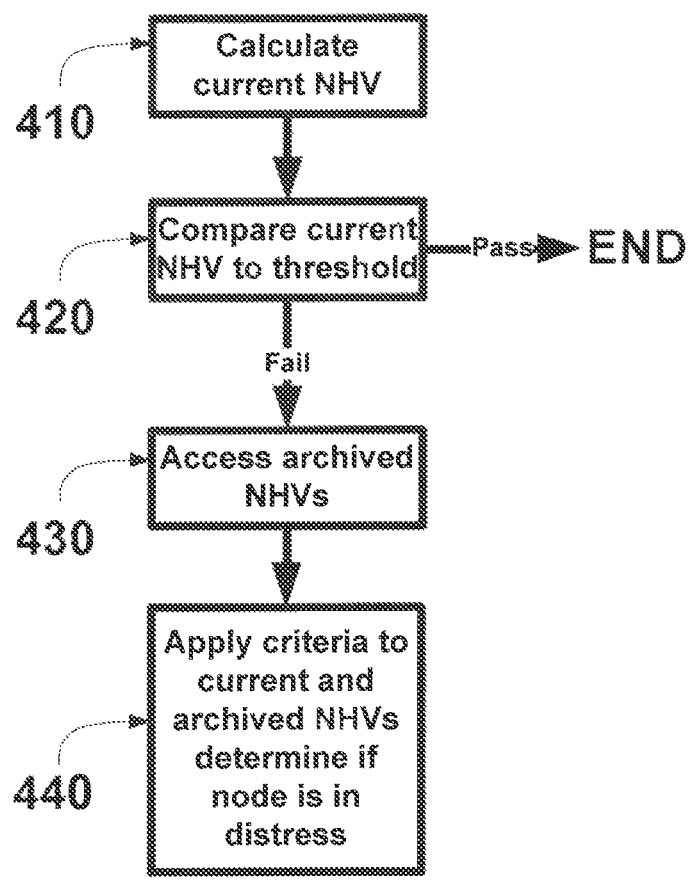
FIG. 4 illustrates a flowchart of an example method for determining whether a node in a HFC network system is in distress in accordance with an embodiment of the present disclosure.

FIG. 4 illustrates a flowchart of an example method for determining whether a node in a HFC network system is in distress in accordance with an embodiment of the present disclosure. The example method of FIG. 4 may be performed by the node evaluation unit 120 described in accordance with FIGS. 1 and 2.

The method 400 begins at stage 410 where the current NHV for the node is calculated, e.g., using Eq. 2. At stage 420, the current NHV is compared to a node health threshold. If the current NHV meets the threshold ("pass"), which may indicate that the node is currently operating as desired, then the method 400 terminates. On the other hand, if the current NHV fails to meet the threshold ("fail"), the method 400 advances to stage 430 where archived NHVs for the node are accessed. At stage 440, which is similar to stage 330 of FIG. 3, criteria is applied to the current and archived NHVs for the node to determine if the node is in distress. Again, any set of criteria or business rules may be applied. In the example method of FIG. 4, when it is determined that a node is in distress, notification is sent to service personnel so that the node can be serviced and returned to desired levels of functionality.

Figure 5:
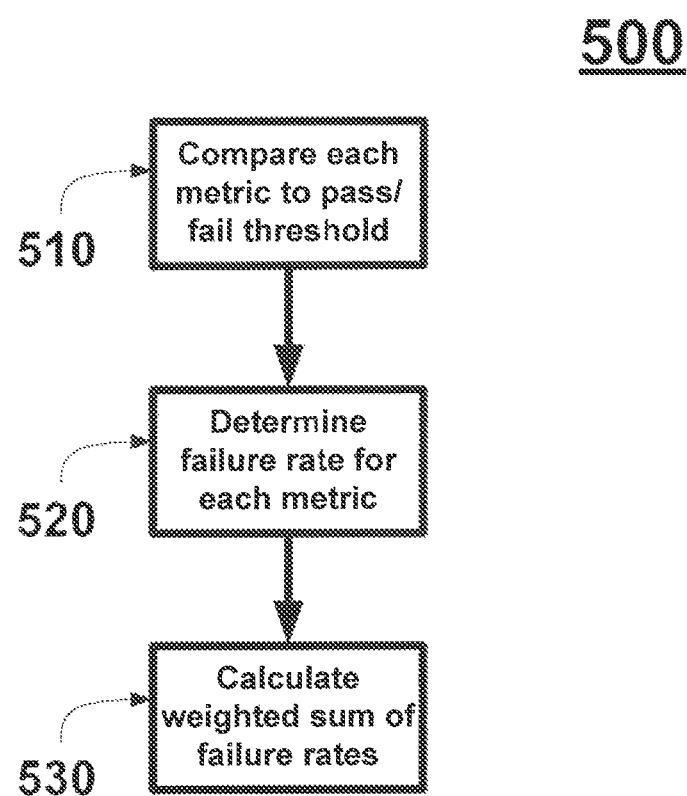
FIG. 5 illustrates a flowchart of an example method for calculating a node health value for a node in a HFC network system in accordance with an embodiment of the present disclosure.

FIG. 5 illustrates a flowchart of an example method for calculating a node health value for a node in a HFC network system in accordance with an embodiment of the present disclosure. The example method of FIG. 4 may be performed by the node health evaluation unit 120 described in accordance with FIGS. 1-2.

The method 500 begins at stage 510 where each of one or more metrics are compared to a pass/fail threshold. As described above, the metrics may relate to operation of the components of the HFC network—such as a CMTS, operation of CPE, communications between CMTS and CPE, and the like. Any number of metrics can be received and analyzed at stage 510. At stage 520, a failure rate is calculated for each metric. The failure rate may be calculated using Eq. 1, described above. At stage 530, the failure rates are weighted and summed to determine a NHV for the node.

As should be apparent to one of ordinary skill in the art, the example methods of FIGS. 3-5 may be performed for each node in a HFC network.

Further, while the systems and methods illustrated in FIGS. 1-5 are directed to a HFC network, it should be apparent to one of ordinary skill in the art that the teachings and techniques of FIGS. 1-5 apply equally to any communications network—wired, wireless, or a combination of wired and wireless—comprising at least one node routing data to customer or user equipment. Examples include, but are not limited to, any type of cable network (e.g., a cable television network (CATV), the public switched telephone network (PSTN), the Internet or other networked computers, etc.), any type of fiber-to-the-x (FTTX) network architecture (e.g., fiber-to-the-node (FTTN), fiber-to-the-curb (FTTC), fiber-to-the-building (FTTB), fiber-to-the-home (FTTH), fiber-to-the-premises (FTTP), fiber-to-the-desk (TFFD), and the like), any type of passive optical network (PON) (e.g., Asynchronous Transfer mode PON (APON), broadband PON (BPON), Giga-bit capable PON (GPON)), any type of active optical network (AON), any type of fiber-optic network, a cellular network, and the like. Likewise, a network node may include any mechanism for routing data to customer or user equipment, such as a fiber node (as described above), powered network equipment (e.g., a router, or switch in an AON), an optical splitter (e.g., a passive optical splitter in a PON), equipment at a base station in a cellular network, and the like.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A communication network comprising:
a cable modem termination system;
a node coupled to the cable modem termination system;
customer premises equipment coupled to the node and configured to communicate with the cable modem termination system through the node;
an evaluation unit configured to calculate one or more node health values of the node and detect whether the node is malfunctioning based at least on the one or more node health values; and
an archiving unit coupled to the evaluation unit and configured to archive the one or more node health values;
wherein the evaluation unit comprises:
a pass/fail determining unit configured to determine a pass/fail value for each of a plurality of metrics associated with communications between the cable modem termination system and the customer premises equipment;
a node health value calculating unit coupled to the pass/fail determining unit and configured to determine the one or more node health values for the node; and
a distress determining unit coupled to the node health value calculating unit and the archiving unit and configured to determine whether the node is malfunctioning.

2. The communication network of claim 1, further comprising a pass/fail threshold for each of the plurality of metrics, wherein the pass/fail determining unit is further configured to compare each of the plurality of metrics to its respective pass/fail threshold to generate the pass/fail value for each of the plurality of metrics.

3. The communication network of claim 2, wherein the pass/fail value is one of a Boolean value and a binary value.

4. The communication network of claim 1, wherein the node health value calculating unit is further configured to determine the one or more node health values for the node by:
determining a failure rate for each of the plurality of metrics for the node using the pass/fail values, and
calculating a weighted sum of the failure rates.

5. The communication network of claim 1, wherein the distress determining unit is further configured to determine whether the node is malfunctioning by considering the one or more node health values calculated for the node over a predetermined period of time as compared to a node health threshold.

6. The communication network 1, wherein the cable modem termination system and the customer premises equipment communicate via a communications protocol adhering to the data over cable service interface specification (DOCSIS).

7. The communication network of claim 1, wherein the plurality of metrics comprise at least one of upstream signal-to-noise ratio, upstream codeword error rate, upstream transmit, downstream receive, downstream signal-to-noise ratio, downstream codeword error rate, upstream correctable codeword error rate, and T3 timeouts.

8. The communication network of claim 1, wherein:
the node comprises a plurality of nodes, each of the plurality of nodes being coupled to the cable modem termination system,
the customer premises equipment comprises a plurality of customer premises equipment, each of the plurality of customer premises equipment being coupled to one of the plurality of nodes, and
the evaluation unit is further configured to calculate one or more node health values for each of the plurality of nodes and detect whether each of the plurality of nodes is malfunctioning based at least on the one or more node health values calculated for the respective node.

9. A method for determining whether a node in a communication network is malfunctioning, the method comprising:
routing, by the node, communications between a cable modem termination system and customer premises equipment;
calculating, by an evaluation unit, a node health value for each of n time periods for the node, wherein n is a whole number greater than 1;
archiving, by an archiving unit, each node health value calculated for the n time periods;
comparing, by the evaluation unit, each node health value calculated for the n time periods to a node health value threshold; and
determining, by the evaluation unit, that the node is malfunctioning when two or more of the node health values calculated for the n time periods are below the node health value threshold, wherein:
the calculating the node health value for each of n time periods for the node comprises:
analyzing a plurality of metrics associated with communications between the cable modem termination system and the customer premises equipment; and
comparing each of the plurality of metrics to a pass/fail threshold to determine a pass/fail value for each of the plurality of metrics; and
wherein the analyzing the plurality of metrics comprises:
calculating a failure rate for each of the plurality of metrics; and
calculating a weighted sum of the failure rates.

10. The method of claim 9, wherein the cable modem termination system and the customer premises equipment communicate via a communications protocol adhering to the data over cable service interface specification (DOCSIS).

11. The method of claim 9, wherein the plurality of metrics comprises at least one of upstream signal-to-noise ratio, upstream codeword error rate, upstream transmit, downstream receive, downstream signal-to-noise ratio, downstream codeword error rate, upstream correctable codeword error rate, and T3 timeouts.

12. A non-transitory computer readable storage medium having instructions encoded thereon, execution of which by at least one processor in a communication network causes execution of a method, the method comprising:
calculating a node health value for each of n time periods for a node of a communication network, wherein n is a whole number greater than 1;
archiving each node health value calculated for the n time periods;
comparing each node health value calculated for the n time periods to a node health value threshold; and determining that the node is malfunctioning when two or more of the node health values calculated for the n time periods are below the node health value threshold, wherein the calculating the node health value for each of n time periods for the node comprises:

analyzing a plurality of metrics associated with communications between a cable modem termination system and a customer premises equipment; and comparing each of the plurality of metrics to a pass/fail threshold to determine determining a pass/fail value for each of the plurality of metrics; and wherein the analyzing the plurality of metrics comprises:

calculating a failure rate for each of the plurality of metrics;

and calculating a weighted sum of the failure rates.

13. The non-transitory computer readable storage medium of claim 12, wherein the plurality of metrics are associated with the data over cable service interface specification (DOCSIS).

14. The non-transitory computer readable storage medium of claim 12, wherein the plurality of metrics comprises at least one of upstream signal-to-noise ratio, upstream codeword error rate, upstream transmit, downstream receive, downstream signal-to-noise ratio, downstream codeword error rate, upstream correctable codeword error rate, and T3 timeouts.

* * * * *

UNITED STATES PATENT AND TRADEMARK OFFICE
CERTIFICATE OF CORRECTION

| | | |
|---|---|---|
| PATENT NO. | : 10,721,539 B1 | Page 1 of 1 |
| APPLICATION NO. | : 14/874069 | |
| DATED | : July 21, 2020 | |
| INVENTOR(S) | : Pillai et al. | |

It is certified that error appears in the above-identified patent and that said Letters Patent is hereby corrected as shown below:

On the Title Page

Column 2, Item (57), under "ABSTRACT", Lines 1-2, delete "an method" and replace with --and method--.

In the Claims

In Column 9, Claim 6, Line 60, delete "network" and replace with --network of claim--.

Signed and Sealed this
First Day of September, 2020

Andrei Iancu
*Director of the United States Patent and Trademark Office*